(No Model.) 3 Sheets—Sheet 1.

E. W. WOODRUFF.
HOLDER FOR LETTERS, FILES, &c.

No. 476,854. Patented June 14, 1892.

Witnesses:
E. K. Sturtevant
S. Brashear

Inventor:
E. W. Woodruff
by H. N. Low
attorney (No Model.) 3 Sheets—Sheet 2.
E. W. WOODRUFF.
HOLDER FOR LETTERS, FILES, &c.
No. 476,854. Patented June 14, 1892.
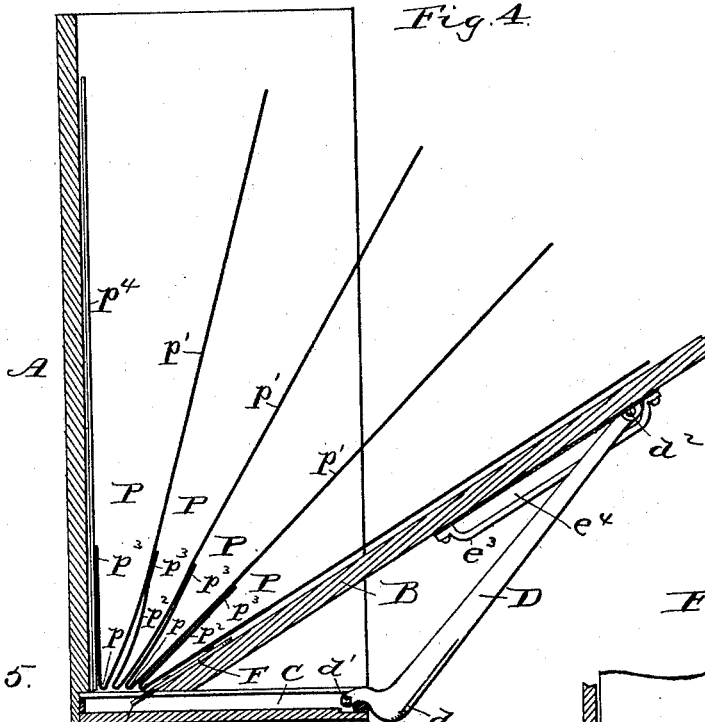
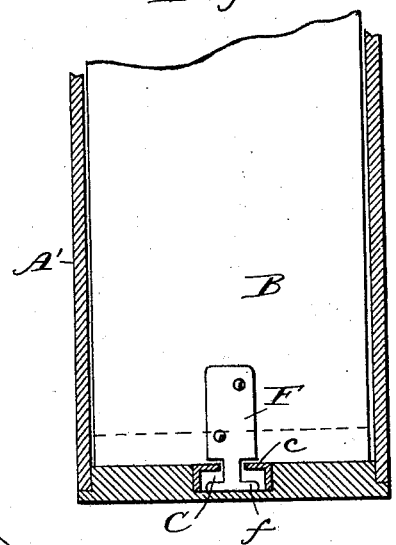
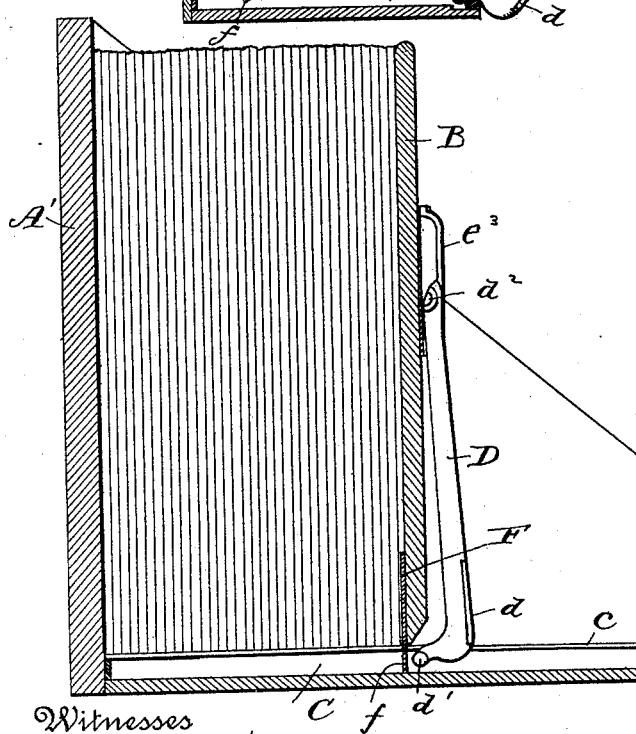
Witnesses
E. K. Sturtevant
S. Brashear
Inventor
E. W. Woodruff,
by H. N. Low
Attorney (No Model.) 3 Sheets—Sheet 3.

E. W. WOODRUFF.
HOLDER FOR LETTERS, FILES, &c.

No. 476,854. Patented June 14, 1892.

Witnesses
E. K. Sturtevant.
S. Brashears

Inventor
E. W. Woodruff.
by H. N. Low
Attorney

UNITED STATES PATENT OFFICE.

EDMUND W. WOODRUFF, OF WASHINGTON, DISTRICT OF COLUMBIA.

HOLDER FOR LETTERS, FILES, &c.

SPECIFICATION forming part of Letters Patent No. 476,854, dated June 14, 1892.

Application filed August 13, 1890. Serial No. 361,880. (No model.)

*To all whom it may concern:*

Be it known that I, EDMUND W. WOODRUFF, a citizen of the United States, residing at Washington, in the District of Columbia, have invented certain new and useful Improvements in Holders for Letters, Files, &c.; and I do declare the following to be a full, clear, and exact description of the invention, such as will enable others skilled in the art to which it appertains to make and use the same.

My present invention relates to the devices whereby the file-board or follower is held or released, with the intent to facilitate the operation of examining the files or documents which the box may contain, and to the devices whereby the papers or documents may be arranged and indexed, with the intent to facilitate examination and prevent the disarrangement of the papers or indexing devices by the operation of the file-board.

This invention may be considered as an improvement upon the document and letter file patented to me June 4, 1889, No. 404,458, although in some respects my present improvements are capable of application to other forms of file-box.

In order to make my invention more clearly understood, I have shown in the accompanying drawings means for carrying the same into practical effect, without, however, intending to limit myself to the exact details of construction which I have, for the sake of illustration, set forth.

Figure 1:
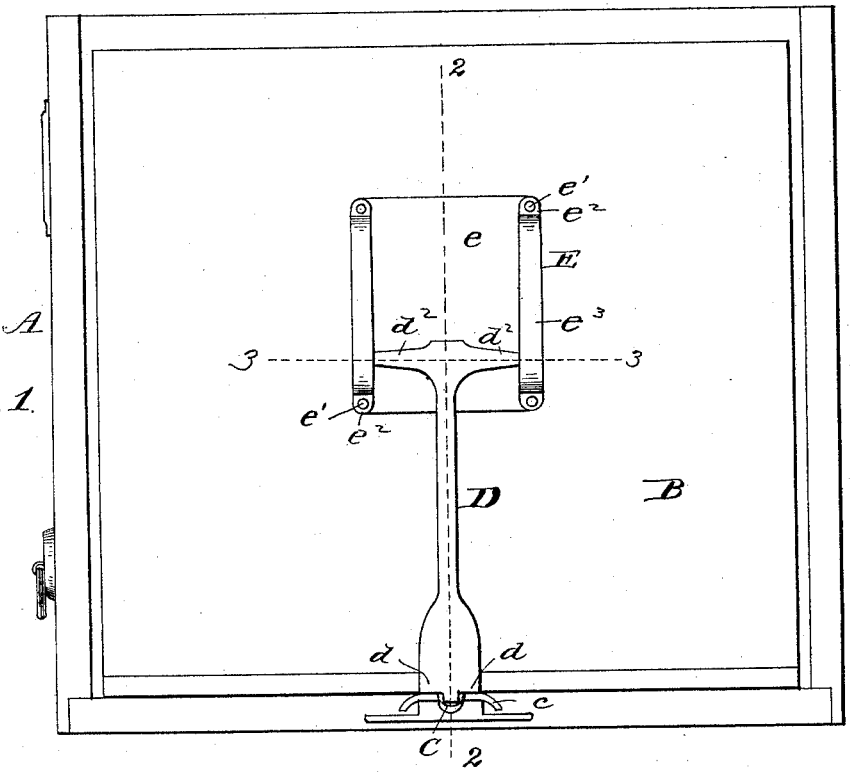
Figure 2:
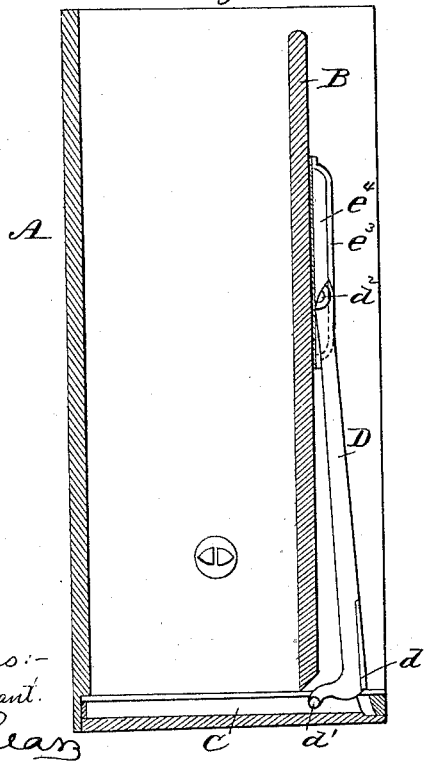
Figure 3:
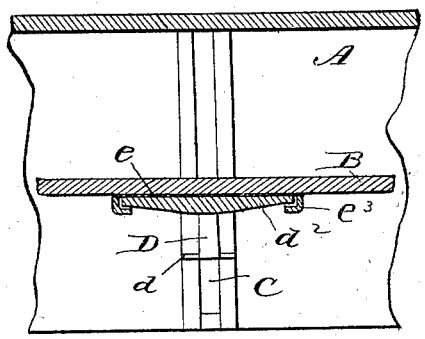
Figure 7:
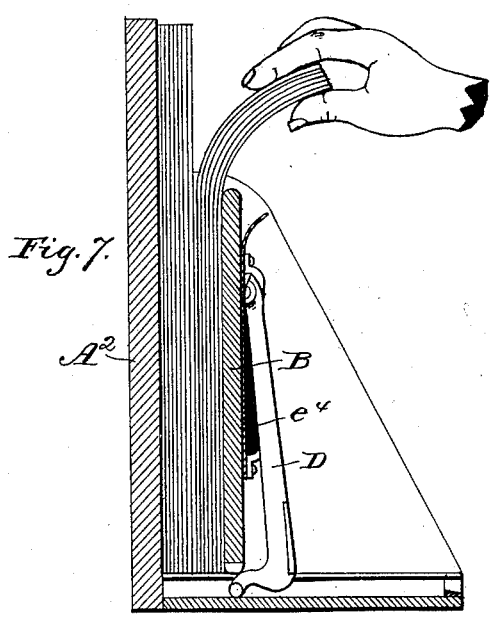
Figure 8:
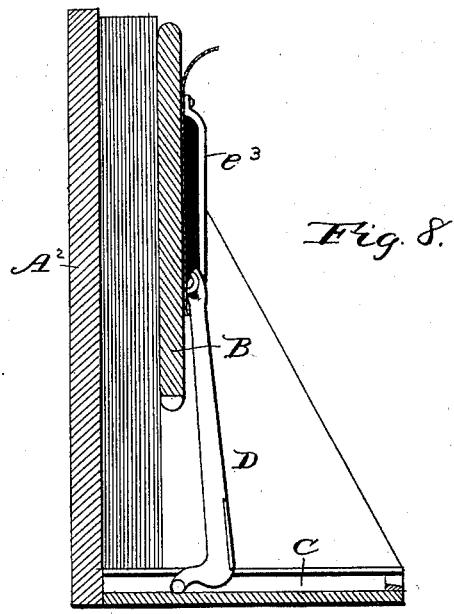
Figure 9:
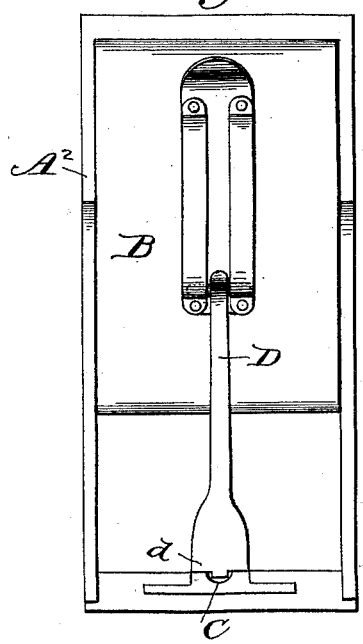
Figure 10:
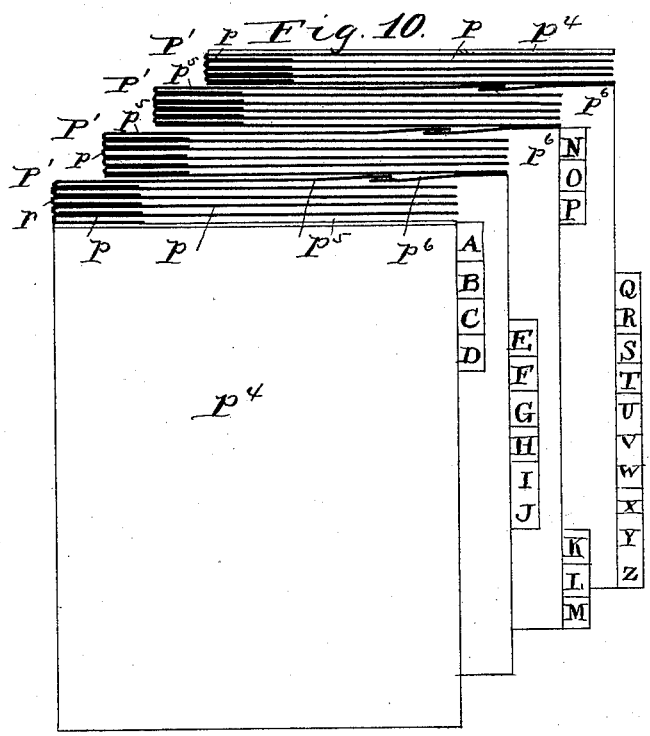

Referring to said drawings, Figure 1 is a side view of a file or document holder which I term for the sake of distinction a "letter-holder," embodying my invention. Fig. 2 is a transverse vertical sectional view of the same on line 2 2, Fig. 1. Fig. 3 is a horizontal section of a portion of the same on line 3 3, Fig. 1. Fig. 4 is a transverse sectional view with the holder open for inspection. Fig. 5 is a longitudinal vertical sectional view of a holder which I term the "file-holder," also embodying a portion of my improvements. Fig. 6 is a transverse sectional view of a portion of the same, showing the inner face of the follower in elevation. Fig. 7 is a transverse vertical section of a holder which for the sake of distinction I term the "note-holder," also embodying a portion of my improvements and illustrating the manner in which an examination of the contents of the holder is made. Fig. 8 is a similar view with the follower elevated to compress the upper ends of the notes. Fig. 9 is a rear elevation of the same. Fig. 10 is a perspective view of the index with its different sections in the positions which they occupy when the follower is in an inclined position supporting the index.

Referring to the drawings, A indicates that form of file-box which I term the "letter-holder," A' that form which I term the "file-holder," and $A^2$ that form of box which I term the "note-holder." Each of these boxes is provided with a file board or follower B, adapted to move toward and from an opposing stationary portion of the box and to hold the contents of the box compressed against said stationary portion or to release said contents and in an inclined position support the files, documents, or letters, so that they may be easily turned over and examined. The letter-holder A is open at its side, and the follower operates in a direction or in planes parallel with the front of the box, while in the document-holder A' and note-holder $A^2$ the box is open at its rear or top and the follower operates in directions or in planes parallel with the sides of the box.

C indicates an undercut groove formed in in one of the interior faces of the box and running in a direction parallel with the direction of the movement of the follower. Preferably this groove is strengthened by flanged metal strips $c$.

D is a locking-lever having at its lower end outer shoulders or projections $d$, adapted to engage the upper sides of the groove C and having inner projections $c'$, adapted to fit within the groove C and to engage its under side. The projections $d'$ being thus prevented from upward movement and the projections $d$ from downward movement, the lever is held from tipping in a well-known manner. At its upper and free end the lever is adapted to bear against the follower and compress the same against the contents of the holder. In the construction illustrated the lever can tip outward into an inclined position only when its base has been withdrawn, so that the projections $d$ are beyond the outer end of the groove C, and if the follower were compelled to move bodily with the lever the lower ends of the papers or documents contained within the holder would be left entirely unconfined. In holders where the papers are thus left unconfined at their lower edges I have found that there is a strong tendency in the papers to work one under the other, with the result that some of them become horizontal, or partly so, upon the bottom of the holder and are confined beneath others which are, on the other hand, raised or forced upward above their proper position. The use of the holder and the movement of the follower toward and from the papers thus frequently results in the disarrangement of the latter, so that they are not found in that uniform arrangement and flat condition which is essential to convenient and rapid examination and removal from the file. I have therefore provided for such a free movement of the file-board relative to the lever in a direction vertical or lengthwise of the lever that the lower edge of the file-board shall always be in such position against the lower edges of the papers as to confine them with a slight pressure, although the holder is open and the upper edges of the papers free to be turned to the right or left, as may be required, by the person examining the contents of the holder. I do not wish to be understood as claiming, broadly, a file-board or follower having such mode of operation; but I claim it in combination with the hereinbefore-described lever. The file board may be held in proper relation opposite to the upper end of the lever and said motion kept within suitable limits by various devices. It may be connected with the upper end of the lever, so as to slide thereon, Figs. 1, 2, and 3, or it may be so connected both with the lever and with the holder, Figs. 5 and 6. A connection with the lever may even be entirely dispensed with and the file-board limited in its movements simply by the sides of the holder between which it operates and by a sliding connection between the lower end of the file-board and the groove C, which would be the construction illustrated by Fig. 4 if the guides upon the file-board which engage the upper end of the lever were omitted.

In Figs. 1, 2, 3, 4, 5, 7, 8, and 9, E indicates a guide way or ways secured to the file-board and engaging laterally-projecting arms $d^2$, formed upon the upper end of lever D. This guide may be formed in various ways. It may, for instance, be cut out and struck up from a blank of sheet metal, or it may be composed of both sheet and cast metal, as shown in the drawings, in which $e$ is a plate of sheet metal secured upon the surface of the file-board by screws or rivets $e'$, which pass through it and also through ears $e^2$, formed upon cast-metal side pieces $e^3$. The latter are formed with recesses $e^4$, in which are confined the ends $d^2$ of the lever. This construction possesses an important advantage in assembling the parts of the holder, inasmuch as the file-board can be applied to the end of the lever when the latter is in its outermost inclined position, Fig. 4, and then twisted into line with the lever, so that the projections $d^2$ shall enter the recesses $e^4$. The follower may be removed by the reverse of this operation. Ordinarily it has been necessary to place the file-board in the holder and the other parts in their proper position before permanently securing the lever to the file-board.

In Figs. 4, 5, and 6 an additional means for limiting the movement of the follower is shown, consisting of a plate F, secured to the lower part of the follower and provided with lateral projections $f$, situated in the groove C and beneath its overhanging edges. This connection, as well as the guide-piece E, above referred to, permits the file-board to bear at its lower edge against the contents of the file, Fig. 4, although the sustaining-lever D be moved away from the file-board and into its inclined position, there being between the lever and follower what I term a "free relative movement." Referring now to Figs. 7, 8, and 9, I will describe how the movement of the file-board relative to the lever is made available in what I term the "note-holder," for the purpose of permitting the convenient and rapid examination of the upper ends of a number of flexible papers and also for the tight compression of said ends when the holder is not in use. This form of holder is especially useful in banks for the purpose of storing notes in uniform order, so that they may at the same time be conveniently and quickly examined. This holder is also useful in offices for analogous purposes, or, in fact, in any place where considerable numbers of very flexible papers are to be kept, so that access may be readily had to any desired one of them. With such papers repeated examination tends, where their upper ends are unconfined, to curl them over, so that they lose their flat shape and cannot be conveniently examined. At the same time it has heretofore been necessary to employ a holder in which the upper ends should be perfectly free for purposes of examination. In the holder now described I attain both results.
When it is desired to find one of the notes or similar papers, the particular holder in which that class to which the paper belongs is kept is removed from its place without loosening the lever D, the file-board is shoved vertically downward, moving relatively to and upon the end of the lever, and the upper ends of the notes are thus left free, Fig. 7. When the desired paper has been found, it may be withdrawn from the holder with or without slightly loosening the lever, as may be found necessary, which will depend upon the tightness with which the follower is pressed against the papers. The follower is then moved vertically upward into its normal position, Figs. 8 and 9, so as to tightly hold and compress the upper ends of the papers, a handle $b$, which may be formed by an outwardly-bent portion of the plate $e$, serving as a convenient means for thus operating the follower. There being no occasion to handle the lower ends of the papers and there being no other tendency to disarrange them, the fact that the follower does not normally press against them is of no consequence.

It is often desirable to hold and examine the contents of a holder in the same manner in which a book is held and used; but the case of the holder is somewhat too cumbersome to be readily held in this manner. I have therefore provided for removing from the holder its contents, or a portion thereof, in a regularly arranged and indexed condition, which collection of papers may be held and used as a book. The means whereby the papers are thus classified and held may be conveniently and properly termed an "index," and it is especially useful in the case of the letter-holder, Figs. 1 and 4. This index also prevents the operation of the file-board, in repeatedly compressing or releasing the papers, from working them out of their places and disarranging them in the manner hereinbefore mentioned.

The index consists, essentially, of a series of pockets which are partially closed, or closed along their lower edges, and which are removable individually, a number of them together, or all together from the holder, and are adapted to carry with them the papers which are contained within the pockets and supported by said closed lower edges. The pockets are indicated at P and their closed edges at $p$. They are preferably formed of leaves $p'$ of stiff paper of nearly the width and height of the holder, bent or folded at $p$ and having short upwardly-extending portions $p^2$. These latter are secured by glue or other suitable means to the next leaf $p'$, and a series of connected pockets is thus formed, which may be conveniently termed a "section" of the index. The first and last leaves (shown at $p^4$) may, if desired, be of stiff card-board, cartridge-board, wood, or sheet metal, with a view to forming a comparatively rigid cover for the index when it is removed from the holder.

In Fig. 4 the holder is shown as provided with but a single section of pockets; but a plurality of sections may be provided, as indicated in Fig. 10, in which is shown in oblique view the index removed from the file, the several sections being indicated at P'. While the sections preferably have a connection with each other, they should be joined in such manner as to permit a relative movement or sliding one upon another, so that when the index is turned into an inclined position the leaves $p'$ may not be bent or rumpled, which, besides injuring the index, would cause the sections or papers therein to be worked out of place. A suitable connection for the purpose is formed between the sections of the index by making the last sheet $p^5$ of each section, except the last, shorter than the leaves $p'$ and providing the first sheet of each section, excepting the first, with a flap $p^6$, beneath the free lower edge of which the upper edge of the leaf $p^5$ may be confined, but in such manner that said leaf may have a free movement beneath the flap. As the index is examined as a whole it thus presents no spaces, excepting the pockets P, the spaces between the sections being covered by the flaps $p^6$. There is also a sufficient connection between the different sections to keep them in place when the whole index is removed from the holder, and finally the connection is such that any section may be removed and replaced without disturbing the other parts of the index.

Another advantage is attained by making the index in sections, which may be clearly seen from an examination of Fig. 10. In this figure the sections are not shown in the position which they ordinarily occupy in the holder with their edges $p$ in the same plane and resting upon the bottom of the holder, but in that relative position which they have when the file-board is thrown into the position shown in Fig. 4 and the index turned down thereon. It will be seen that when this is done the upper edges of the different sections will lie in different planes, each lower section projecting from under the section above it. The index-letters being attached to these edges, all of said indices will be exposed, and it is unnecessary to confine them to a single row, as has heretofore ordinarily been done, for the reason that if placed in more than one row the under row or rows would be concealed by the top row. I am thus enabled to employ large and distinct index-marks and to use a large number of pockets when it is desired.

Having thus described my invention, what I claim is—

1. In a file-box or document-holder, the combination of a case or frame having an undercut groove in one of its interior faces, a file-board or follower within and connected with said case and movable therein, and a tilting or oscillating locking-lever having at its lower end outer shoulders or projections engaging the upper sides of said groove and inner projections engaging the under sides of the groove and adapted to bear at its free end against the follower, said follower having a sliding bearing upon the lever and a free downward-sliding movement relative thereto in lines parallel with the follower, substantially as set forth.

2. In a file-box or document-holder, the combination, with the case or frame open at its top and a file-board or follower, of a removable index having partially-closed pockets for the reception of the letters or documents, the pockets being indexed on their open edges and having their latter edges presented to the open top of the case, substantially as set forth.

3. In a file-box or document-holder having a follower adapted to assume an inclined position, the combination, with the case or frame, of a removable index formed in separate sections and having partially-closed pockets for the reception of the letters or documents, whereby the sections may slide relative to each other, and the contents of the file or a portion thereof contained in one of said sections may be removed and examined while still retained in proper place and arrangement by the said pockets or the section, substantially as set forth.

4. The herein-described index, adapted for use in a file-box or document-holder, consisting of a plurality of separate sections loosely connected but adapted to slide relative to each other, as described, each section being provided with one or more partially-closed pockets for the reception of letters or documents, substantially as set forth.

5. The herein-described index, adapted for use in a file-box or document-holder, consisting of a plurality of sections loosely connected together, having pockets and adapted to move or slide one upon another, and marginal indicating-marks arranged in two or more rows, the under of which are exposed by said movement of the sections, substantially as set forth.

6. In a file-box or document-holder, the combination, with the box case or frame, of a file-board or follower, an index, and a supporting and locking device for the follower, adapted to permit the lower edge of the latter to bear against the lower edge of the index when the holder is opened, substantially as set forth.

7. In a file-box or document-holder, the combination of a case or frame having an undercut groove in one of its interior faces, a removable index having partially-closed pockets, the open edges of which pockets are presented to an open top or side of the case, a file-board or follower within said case and adapted to engage the side of the index and to assume an inclined position, and a tilting or oscillating locking-lever D, having inner and outer projections or shoulders adapted to engage said groove, bearing at its free end against said follower and having a sliding engagement therewith, substantially as set forth.

8. In a file-box or document-holder, the combination of a case or frame, a file-board or follower shorter than the end or side of the case with which it is parallel, a support for said follower, which is immovable in the direction of the length of the follower, and slide-connecting devices between said support and the follower, whereby the follower may be thrust down to expose the ends of the documents for examination or drawn up to clamp and flatten them, substantially as set forth.

In testimony whereof I affix my signature in the presence of two witnesses.

EDMUND W. WOODRUFF.

Witnesses:
H. N. LOW,
E. K. STURTEVANT.